United States Patent [19]

Danielis

[11] 3,719,512

[45] March 6, 1973

[54] BRICK COMPOSITION

[76] Inventor: Joseph U. Danielis, 8622 Basswood, Apartment 5, Pierrefonds, Quebec, Canada

[22] Filed: July 27, 1970

[21] Appl. No.: 58,711

[30] Foreign Application Priority Data

May 19, 1970 Canada............................083396

[52] U.S. Cl..................................106/106, 106/108
[51] Int. Cl................................................C04b 9/02
[58] Field of Search......................106/108, 107, 106

[56] References Cited

UNITED STATES PATENTS 1,864,287    6/1932    Welch..................................106/108

Primary Examiner—James E. Poer
Attorney—Alan Swabey

[57] ABSTRACT

Indoor brick, tile or siding, light-weight, fire-resistant, light-fast, non-curling and easy to install. The product is made of a composition of magnesium oxychloride binder, a main filler of particulate non-metallic material in the nature of finely divided vegetable or inert mineral material and a pigment filler in the nature of metallic oxides. The magnesium oxychloride is a reaction product of magnesium chloride and magnesite in a water medium, the magnesium chloride prior to the reaction having been present (on a dry weight basis) to the magnesite of from about 70 percent to about 100 percent. The main filler is present in an amount of from about 150 percent to about 250 percent (on a dry volume basis) to the magnesite. The pigment filler is present in an amount of from about 17 percent to about 80 percent to the magnesite calculated as substantially dry weight basis. The product is made by preparing a solution of magnesium chloride of from 15° to 25° Baume, adding to the solution the pigment filler, adding magnesite, adding the main filler, mixing the resulting composition to form a paste, pouring the paste into a mould in a layer, if desired dividing the layer into sections, and allowing the resulting product to harden.

9 Claims, No Drawings

BRICK COMPOSITION

BACKGROUND OF THE INVENTION

1. Field of the Invention

This invention relates to facing sheet material in the nature of simulated bricks, tiles and the like and to a process for their manufacture.

2. Description of Prior Art

Such products function as decorative and structural members. Today, most bricks, etc. are made of clay or mortar, and tiles of plastics, fiberglass, portland cement and fused vermiculite. These products are heavy, cumbersome, hard to apply, expensive, and generally unsuitable for indoor use.

SUMMARY OF THE INVENTION

The applicant has now developed improved facing sheet material in the nature of brick, tile, or siding specially suitable for indoor use. The applicants product is made up essentially of a dried mixture of magnesium oxychloride cement, a main non-metallic filler, for example wood flour, and a pigment filler selected from the group consisting of metallic oxides and carbon black.

The magnesium oxychloride cement is the reaction product of magnesium chloride and magnesite (as finely ground calcined magnesia) in a water medium where the magnesium chloride prior to reaction was present in a weight ratio to the magnesite calculated on a substantially dry basis of from about 70 percent to about 100 percent. The metallic oxide is present in a weight ratio calculated, on the basis of substantially dry magnesite, of from about 17 percent to about 80 percent. The wood flour is present in an amount of from about 150 percent to about 250 percent (on a dry volume basis) to the magnesite. A preferred amount of pigment filler is from about 20 percent to about 70 percent on the basis mentioned.

The relative quantities of the magnesite and magnesium chloride are important to provide a product having the desired characteristics. Too little magnesium chloride would leave a wasted residue of uncombined magnesium oxide and too much magnesium chloride would leave a surface bloom on the finished product. And, because of its hygroscopicity, would absorb moisture.

Articles, according to the invention, may be made as follows. First magnesium chloride is mixed with water to the desired concentration, that is, between about 15° to about 25° Baume preferably between about 17° and about 23° Baume. This is a simple way of determining the ratio of water to magnesium chloride. Degree Baume means half of the percentage by weight of salt contained in the solution. For example, 16° Baume represents 32 percent salt, 25° Baume represents 50 percent slat and so on.

The density Baume to be used may be determined as follows, taking a specific formulation, by way of example. First, a trial mix is made by introducing, into a given quantity of water, magnesium oxide, iron oxide and wood flour, being all the materials making up the final composition of the invention, except the magnesium chloride. The materials are mixed and water added till a trowellable putty-like consistency is reached. The total amount of water added (by weight) is then noted. These results are then applied to preparing a second trail mix, in which there are mixed together all the constituents, this time including the magnesium chloride. In this mix, there is introduced an amount by weight of magnesium chloride equal to or slightly less than (70 to 100 percent) the magnesium oxide present. Water is then added till the desired consistency is reached. The relative amounts of the materials, including the water in the second trail mix gives an index for preparing the actual working mixes.

To make the actual working mix, a solution of magnesium chloride in water is prepared, the relative amounts of magnesium chloride and water by weight being the same as in the second trial mix. This solution is prepared in advance, in sufficient quantities to serve for a number of batches of the final composition. Then, as required, batches of the composition of the invention are made by adding the proper amounts of magnesium oxide, iron oxide and wood flour to the magnesium chloride solution in the proportion of the second trial mix.

To this end, the magnesite and metallic oxide are added to the magnesium chloride solution and mixed thoroughly. The main filler (wood flour or equivalent) is added and mixed thoroughly to form a paste having the density of a pudding. This wet composition is a trowellable mass which is different from some prior art compositions in that it does not compress but spreads somewhat like the icing on a cake. To make bricks the wet composition is poured into moulds to a preferred thickness of between one-eighth of an inch and half an inch, with an optimum thickness around one-quarter of an inch. Several moulds may be filled at a time. Then the poured composition in the moulds is cut into squares or whatever form is desired for the finished brick or tile. Or, if desired, the paste may be poured into separate moulds, and the material allowed to remain until hard enough to extract in one piece.

The finished products are allowed to stand for at least about six hours at normal room temperature which can vary for example from 60°F to 90°F to allow the material to set. Then they are put in an oven and subjected to the action of hot air circulating dry at about 130°F to 165°F. The drying period will vary with the temperature of and the speed and dryness of the air circulating. A waterproofing agent may be added to the mixtures during their preparation.

The sheet material end products simulate natural clay bricks, tile or siding, are cheap to manufacture, and are thin, light-weight, light-fast and do not curl, and are easy to install. They have the feel and appearance of natural brick. They do not dust or crumble. They are highly fire-resistant and will not support combustion. The products may be applied to substrates by use of suitable adhesives, e.g. latex and epoxy cements, and may be painted or coated. In addition, the products possess excellent sound, heat and electrical insulating values.

A feature of facing sheet material according to the invention is that it has a relatively low impact strength. This results from using relatively small quantities of oxychloride and relatively coarse materials. For example, to use wood flour having a mesh size not lower than about 50 and not higher than about 100 mesh. Around 70 is preferred.

Once applied, in place of incorporating a waterproofing agent into the brick composition, the siding material may be coated with a silicone compound and/or stain and waterproofed with a fluoro carbon mixture, for example that marketed under the trade mark "Scotch Guard".

The magnesite used should be of the caustic-calcined type which is principally composed of magnesia (magnesium oxide) of the formula MgO. The purity of the product, as commercially available, may vary between about 80 percent to about 86 percent. This is not critical as long as the impurities present do not interfere with the reaction between the magnesium chloride and the magnesite. Seawater magnesia may be used. When seawater magnesia is used, its tendency to shrink must be compensated for.

The main filler is an inert particulate or finely divided material of which examples are vegetable material, for instance sawdust, wood flour, vegetable fibers, for example bast fibers, among which may be mentioned fibers like hemp, ramie, and sisal, inert mineral material, for instance asbestos fiber, powder or flake mineral material like vermiculite, pumice diatomaceous earth or clays, for example bentonite, ground stone, talc, ground marble or ground brick. The function of the filler is to give body and strength to the finished product. Wood flour is a preferred material of which any suitable grade may be used. There may be used any suitable grade of non-resinous wood flour, having a mesh size preferably between 60 to about 100 mesh and may be made from hard or soft wood. The filler preferably is substantially moisture free. It must not be wet with ordinary water, apart from the solution, as described. The main filler is present in an amount of from about 1½:1 to about 2½:1, based on a volume ratio to substantially dry magnesite.

The pigment filler is selected from the group consisting of metallic oxides and carbon black. While the metallic oxide is used in massive amounts as a filler, the particular oxide is also chosen to impart the desired color.

Metallic oxides have been proposed in the prior art in amounts of from about 1 to 5 percent, to impart the desired color characteristics. But, by incorporating the large amounts specified, the applicant produces the special characteristics in the products described. The metallic oxide employed should be finely ground, preferably micronized. The degree of fineness determines the quantity used, within the limits above mentioned.

The pigment filler chosen depends on the color desired, for example titanium oxide, or zinc oxide for white, or the iron oxides for red, brown, yellow or black. Combinations of these pigments can be used to provide various color graduations.

DESCRIPTION OF PREFERRED EMBODIMENTS

Having thus generally described the invention, reference will now be made to the following examples, illustrating specific preferred embodiments.

EXAMPLE 1

First the magnesium chloride is mixed with water, at room temperature, until all the magnesium chloride was dissolved. Into this solution was put the magnesium oxide and the iron oxide and mixed thoroughly. The wood flour and the perlite was then added and mixed until a uniform paste was formed.

The pudding-like trowellable paste was then poured into large rectangular flat based moulds, and trowelled to form a layer ¼ inch thickness. Ten to 15 minutes after the paste was poured into the mould and had set to a semi-solid consistency, marking wheels were passed over the moulds to divide the paste into 2-inch wide strips and the marking wheels were passed in the cross direction to divide the strips into seven and ¾ inch lengths resulting in strips 2 inches by 7¾ inches.

EXAMPLE 2

The procedure of Example 1 was followed. 1 gallon of magnesia, 44 ounces of red oxide, mixed in 24 pounds 11 ounces of water at 19° Baume magnesium chloride solution. 2 gallons of wood flour No. 70 were added.

EXAMPLE 3

A composition was formulated as in Example 1 of 25 pounds of water at 19° Baume magnesium chloride solution, 44 ounces of red oxide and 1 gallon of magnesia were added and mixed well. Four-thirds of a gallon of wood flour and two-thirds of a gallon of white perlite were added, mixed well and poured.

EXAMPLE 4

To 24 pounds 11 ounces of water at 19° Baume magnesium chloride solution were added 30 ounces of yellow oxide and 2 ounces of red oxide, and the composition mixed well. 1 gallon of magnesite was added and mixed. 2 gallons of wood flour were added. The procedure followed was substantially as in Example 1.

EXAMPLE 5

A procedure was carried out substantially as in Example 1. To 24 pounds of water at 19° Baume magnesium chloride solution were added 15 ounces of a carbon black solution known as "Aqua Black K" (this is a trade mark of Columbian Carbon Company), 18 ounces of red oxide and 1 gallon of magnesia. The composition was mixed well and 2 gallons of wood flour added. This gave a brown brick.

EXAMPLE 6

To 24 pounds 8 ounces of 19° Baume magnesium chloride solution 55 ounces of titanium oxide, and 1 gallon of magnesia were added along with two-thirds gallons of white perlite and four-thirds of a gallon of white wood flour. The composition was mixed well and employed substantially as in Example 1.

EXAMPLE 7

To 25 pounds of 19° Baume magnesium chloride solution was added 50 ounces of titanium oxide, 1 gallon of magnesia, and mixed well. Two-thirds of a gallon of perlite and four-thirds of a gallon of white wood flour was added and the composition mixed and poured substantially as in Example 1.

I claim:

1. A thin light weight decorative facing sheet material having a thickness from one-eighth to one-half inch, comprising a solid intimate mixture of a magnesium oxychloride binder, an inert finely divided filler selected from the group consisting of vegetable materials in particulate or fibrous form and crude mineral material in particulate or flake form, and a pigment selected from the group consisting of metallic oxide pigments and carbon black, the magnesium oxychloride being the reaction product of magnesium chloride and magnesite in a water medium in which the magnesium chloride prior to reaction was present in a weight basis to the magnesite calculated on a substantially dry basis of from about 70 percent to about 100 percent, the pigment being present on a weight basis calculated on the basis of substantially dry magnesite from about 17 percent to about 80 percent, the filler being present in an amount of from about 150 percent to about 250 percent to the magnesite calculated on a substantially dry volume basis.

2. A sheet material, as claimed in claim 1, in which the pigment is an iron oxide.

3. A sheet material, as claimed in claim 1, in which the pigment is a zinc oxide.

4. A sheet material, as claimed in claim 1, in which the pigment is a titanium oxide.

5. A sheet material, as claimed in claim 1, in which the pigment is carbon black.

6. A sheet material, as claimed in claim 1, in which the filler is wood flour.

7. A composition of matter for making thin light weight decorative facing sheet material comprising a moldable paste being an intimate mixture of magnesium oxychloride, an inert finely divided filler selected from the group consisting of vegetable materials in particulate or fibrous form and crude mineral material in particulate or flake form, and a pigment selected from the group consisting of metallic oxides and carbon black, the magnesium oxychloride being the reaction product of magnesium chloride and magnesite in a water medium in which the magnesium chloride prior to reaction was present in a weight basis to the magnesite calculated on a substantially dry basis to the magnesite calculated on a substantially dry basis of from about 70 percent to about 100 percent, the pigment being present in the body in a weight basis calculated on the basis of substantially dry magnesite of from about 17 percent to about 100 percent, the pigment being present in the body in a weight basis calculated on the basis of substantially dry manesite of from about 17 percent to about 80 percent, the filler being present in an amount of from about 150 percent to about 250 percent to the magnesite calculated on a substantially dry volume basis.

8. A composition of matter, as defined in claim 7, in which the filler is wood flour.

9. A composition of matter, as defined in claim 7, in which the pigment is selected from the group consisting of oxide pigments of iron, titanium and zinc and carbon black.

* * * * *